(12) United States Patent
Anerousis et al.

(10) Patent No.: US 8,473,432 B2
(45) Date of Patent: Jun. 25, 2013

(54) ISSUE RESOLUTION IN EXPERT NETWORKS

(75) Inventors: Nikolaos Anerousis, Chappaqua, NY (US); Shu Tao, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/841,624

(22) Filed: Jul. 22, 2010

(65) Prior Publication Data

US 2012/0023044 A1 Jan. 26, 2012

(51) Int. Cl.
*G06N 5/00* (2006.01)

(52) U.S. Cl.
USPC .............................................. 706/12; 706/45

(58) Field of Classification Search
USPC ..................................................... 706/12, 45
See application file for complete search history.

(56) References Cited

U.S. PATENT DOCUMENTS

| | | | |
|---|---|---|---|
| 7,225,139 B1 | 5/2007 | Tidwell et al. | |
| 7,366,731 B2 | 4/2008 | Lewis et al. | |

OTHER PUBLICATIONS

De la Sen, et al, An expert network for obtaining approximate discrete-time models for LTI systems under real sampling using parameter identification, Emerging Technologies and Factory Automation, 2003. Proceedings. ETFA '03. IEEE Conference, Sep. 16-19, 2003, pp. 462-469.*

Rogers, An Expert Network Process Control Application, Master's Thesis, University of Missouri, 1994, pp. 1-135.*

J. Anvik et al., "Who Should Fix This Bug?" IEEE, 28th International Conference on Software Engineering, May 2006, pp. 361-370, Shanghai, China.

K. Balog et al., "Formal Models for Expert Finding in Enterprise Corpora," 29th Annual International ACM Conference on Research and Development in Information Retrieval, Aug. 2006, pp. 43-50.

M. Belkin et al., "Manifold Regularization: A Geometric Framework for Learning from Examples," The Journal of Machine Learning Research, Dec. 2006, pp. 2399-2434, vol. 7.

P. Calado et al., "Combining Link-Based and Content-Based Methods for Web Document Classification," 12th ACM International Conference on Information and Knowledge Management, Nov. 2003, pp. 394-401.

H. Deng et al., "Formal Models for Expert Finding on DBLP Bibliography Data," IEEE, 8th International Conference on Data Mining, 2008, pp. 163-172.

H. Fang et al., "Probabilistic Models for Expert Finding," Lecture Notes in Computer Science, 29th European Conference on Information Retrieval, Apr. 2007, pp. 418-430, vol. 4425, Rome, Italy.

A. Jamain et al., "The Naive Bayes Mystery: A Classification Detective Story," Pattern Recognition Letters, Feb. 2005, pp. 1752-1760, vol. 26, No. 11.

(Continued)

*Primary Examiner* — Wilbert L Starks

(74) *Attorney, Agent, or Firm* — Louis J. Percello; Ryan, Mason & Lewis, LLP

(57) ABSTRACT

Techniques are provided for improved issue resolution in an expert network. For example, a method comprises the following steps. Information is extracted comprising: content of one or more historical records associated with resolutions of one or more previous issues; and transfer routing sequences indicating routes through routing entities in an expert network that the one or more previous issues passed in order to be respectively resolved. A model is computed based on at least a portion of the extracted information, wherein the computed model statistically captures one or more ticket transfer patterns among routing entities in the expert network. One or more future issue resolution routing recommendations are determined based on at least one of the one or more ticket transfer patterns captured by the computed model.

28 Claims, 5 Drawing Sheets

OTHER PUBLICATIONS

Thorsten Joachims, "Text Categorization with Support Vector Machines: Learning with Many Relevant Features," European Conference on Machine Learning, 1998, pp. 137-142.

Z. Kou et al., "Stacked Graphical Models for Efficient Inference in Markov Random Fields," Siam International Conference on Data Mining, Apr. 2007, 6 pages.

Q. Lu et al., "Link-Based Text Classification," International Joint Conference on Artificial Intelligence Workshop on Text Mining and Link Analysis, Aug. 2003, 8 pages.

J. Neville et al., "Iterative Classification in Relational Data," AAAI Workshop on Learning Statistical Models from Relational Data, 2000, pp. 42-49.

H. Permuter et al., "A Study of Gaussian Mixture Models of Color and Texture Features for Image Classification and Segmentation," Pattern Recognition, Apr. 2006, pp. 695-706, vol. 39, No. 4.

J.C. Platt et al., "Large Margin DAGs for Multiclass Classification," Advances in Neural Information Processing Systems, 2000, pp. 547-553.

P. Sen et al., "Collective Classification in Network Data," Artificial Intelligence Magazine, Association for the Advancement of Artificial Intelligence, Sep. 2008, pp. 93-106, vol. 29, No. 3.

P. Serdyukov et al., "Modeling Multi-Step Relevance Propagation for Expert Finding," 17th ACM Conference on Information and Knowledge Management, Oct. 2008, pp. 1133-1142.

Q. Shao et al., "Efficient Ticket Routing by Resolution Sequence Mining," 14th ACM International Conference on Knowledge Discovery and Data Mining, Aug. 2008, pp. 605-613.

Y. Yang et al., "A Re-examination of Text Categorization Methods," 22nd ACM International Conference on Research and Development in Information Retrieval, 1999, pp. 42-49.

Y. Yang et al., "Comparative Study on Feature Selection in Text Categorization," 14th International Conference on Machine Learning, Jul. 1997, pp. 412-420.

J.S. Yedidia et al., "Constructing Free Energy Approximations and Generalized Belief Propagation Algorithms," IEEE Transactions on Information Theory, Jul. 2005, pp. 2282-2312, vol. 51, No. 7.

J.S. Yedidia et al., "Generalized Belief Propagation," Advances in Neural Information Processing Systems, Dec. 2000, pp. 689-695, vol. 13.

Harry Zhang, "The Optimality of Naive Bayes," 17th International Florida Artificial Intelligence Research Society Conference, Jul. 2004, 6 pages.

D. Zhou et al., "Learning with Local and Global Consistency," Advances in Neural Information Processing Systems, Dec. 2003, pp. 321-328, vol. 16.

X. Song et al., "ExpertiseNet: Relational and Evolutionary Expert Modeling," Lecture Notes in Computer Science, User Modeling, 2005, pp. 99-108, vol. 3538.

* cited by examiner

| ID | DESCRIPTION | INITIAL GROUP |
|---|---|---|
| 8805 | USER RECEIVED AN ERROR R=12 WHEN INSTALLING HYPERION. WHEN TRIED TO INSTALL AGAIN, GOT SUCCESS MSG, BUT UNABLE TO OPEN THE APPLICATION IN EXCEL | HDBTOIGA |

| ID | TIME | ENTRY |
|---|---|---|
| 8805 | 9/29/2XXX | ... (MULTI TRANSFER STEPS) ... |
| 8805 | 10/2/2XXX | TICKET 8805 TRANSFERRED TO GROUP NUS_N_DSCTS |
| 8805 | 10/2/2XXX | RESOLUTION: ENABLED ESSBASE IN EXCEL |

800

ISSUE RESOLUTION IN EXPERT NETWORKS

FIELD OF THE INVENTION

The present invention relates generally to expert networks, and more particularly to issue resolution techniques in such expert networks.

BACKGROUND OF THE INVENTION

Issue resolution is critical to the information technology (IT) services business. A service provider might need to handle, on a daily basis, thousands of "tickets" that report various types of issues (e.g., problems) from its customers. As is known, a "ticket" is a record or log describing an issue raised by a customer that is to be acted upon by a service provider. The log or record may be in electronic form or paper form.

The service provider's ability to resolve the tickets (i.e., ticket resolution) in a timely manner determines, to a large extent, its competitive advantage. To attempt to manage ticket resolution effectively, human experts are often organized into expert groups (collectively, an "expert network"), each of which has the expertise to solve certain types of problems. As IT systems become more complex, the types of reported problems become more diverse. Finding an expert group to solve the problem specified in a ticket is a long-standing challenge for IT service providers.

SUMMARY OF THE INVENTION

Illustrative principles of the invention provide techniques for improved issue resolution in an expert network.

For example, in one aspect, a method comprises the following steps. Information is extracted comprising: content of one or more historical records associated with resolutions of one or more previous issues; and transfer routing sequences indicating routes through routing entities in an expert network that the one or more previous issues passed in order to be respectively resolved. A model is computed based on at least a portion of the extracted information, wherein the computed model statistically captures one or more ticket transfer patterns among routing entities in the expert network. One or more future issue resolution routing recommendations are determined based on at least one of the one or more ticket transfer patterns captured by the computed model.

The method may further comprise obtaining a new issue request. At least one of the one or more future issue resolution routing recommendations may be utilized to resolve the new issue. Alternatively, at least one of the one or more future issue resolution routing recommendations may be utilized to determine a next routing entity in the expert network to which to route the new issue request.

In one embodiment, the one or more records may comprise one or more problem tickets.

Advantageously, illustrative embodiments of the invention provide a unified generative model, e.g., an Optimized Network Model (ONM), that characterizes the lifecycle of a ticket, using both the content and the routing sequence of the ticket. The ONM uses maximum likelihood estimation to represent how the information contained in a ticket is used by experts to make ticket routing decisions. Based on the ONM, a probabilistic algorithm is provided to generate ticket routing recommendations for new tickets in a network of expert groups. The algorithm may calculate all possible routes to potential resolvers (e.g., expert(s) that provide an appropriate resolution to the problem) and make globally optimal recommendations, in contrast to existing classification methods that make static and locally optimal recommendations.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention will be described herein in the context of illustrative problem ticket resolution with regard to information technology (IT) systems. It is to be appreciated, however, that the principles of the present invention are not limited to IT systems, nor are they limited to problem tickets. Rather, the principles of the invention are directed broadly to techniques for improved efficiency in issue resolution between two entities. That is, one entity may request (i.e., not necessarily with the use of a ticket) some response from the other entity relating to some issue (i.e., not necessarily a problem). The entity that receives the request then utilizes an expert network to determine an appropriate response to the issue. The two entities could be within the same enterprise (i.e., business concern or company) or could each be associated with different enterprises, or no enterprise at all. The entities could be individuals or computing devices. One entity could be an individual and the other a computing device. For this reason, numerous modifications can be made to the embodiments shown that are within the scope of the present invention. That is, no limitations with respect to the specific embodiments described herein are intended or should be inferred.

Figure 1:
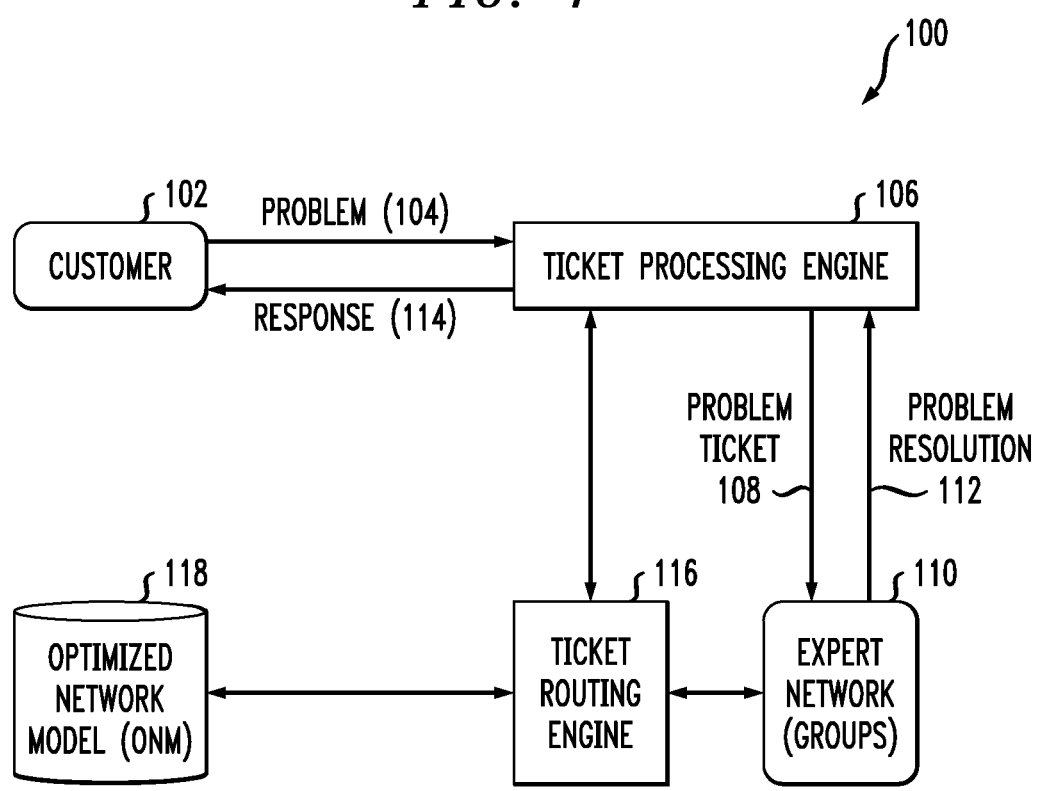
FIG. 1 illustrates a ticket resolution system in accordance with which a methodology according to an embodiment of the invention is implemented.

In accordance with one illustrative embodiment of the invention, FIG. 1 illustrates a ticket resolution system within which an improved ticket resolution methodology is implemented.

As shown, a ticket resolution system 100 includes a customer 102 sending a message 104 indicating a problem (i.e., more generally, an issue) to a ticket processing engine 106. In this embodiment, it is assumed that the customer is operating on a client computing device and the ticket processing engine is implemented on a server computing device. The client and server may be communicating over a public network (e.g., Internet), a private network (e.g., intranet), or some combination thereof. In this example, the problem message 104 may describe some IT problem that the customer is experiencing and that an IT service provider (which manages and maintains the ticket processing engine 106) is contracted with to resolve.

It is assumed that a problem ticket 108 (e.g., record or log) is generated by the ticket processing engine 106 in response to the problem message 104 received from the customer 102. It is also possible that the customer 102 is able to download (or otherwise access) a problem ticket template from the ticket processing engine 106 such that the customer can generate the problem ticket on his/her computing device, and send it to the ticket processing engine 106 as part of message 104. Still further, the problem ticket 108 could be generated by an internal staff member (e.g., customer service representative or call center staff) of the IT service provider in response to a phone call or online message (e.g., email) conveyed by the customer to the staff member. Each method of ticket generation may be handled by the ticket processing engine 106.

The ticket 108 generated in accordance with the ticket processing engine 106, as mentioned above, is subsequently routed through a network of expert groups 110 (collectively, expert network) for resolution. It is to be appreciated that each expert group may include one or more expert individuals (human experts), one or more expert computing devices (computer-based experts), or some combination thereof. Some or all of the experts may be co-located with the ticket processing engine, or remotely located.

The ticket is closed when it reaches an expert group (resolver) that provides a solution to the problem reported in the ticket. The problem resolution may be reported back to the ticket processing engine 106 via message 112, which then sends a response message 114 to the customer 102. It is also possible that no response is necessary to be sent back to the customer, and that the customer feedback will simply be a realization that some service is now working again or made otherwise available.

Figures 2, 3:
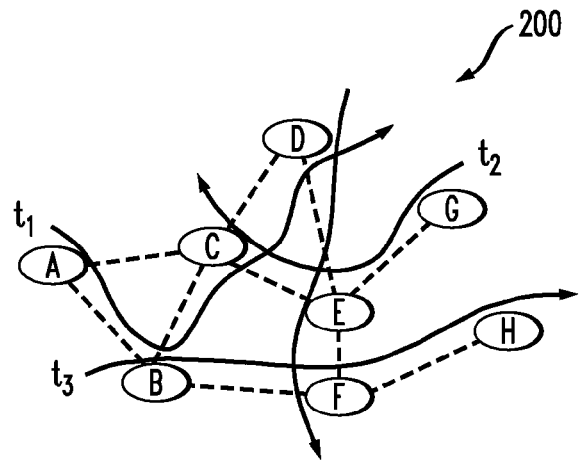
FIG. 2 illustrates an exemplary interaction between groups of an expert network with ticket routing examples, according to an embodiment of the invention.
FIG. 3 illustrates a problem ticket example, according to an embodiment of the invention.

Turning for the moment to FIG. 2, exemplary interactions 200 are shown between expert groups (A through H) in an expert network (such as expert network 110 in FIG. 1) with ticket routing examples. That is, a ticket may be passed from one expert group to another until the appropriate resolver is determined. As shown, for example, problem ticket $t_1$ starts at group A and ends at group D, while problem ticket $t_2$ starts at group G and ends at group C, and further while problem ticket $t_3$ starts at group B and ends at group H (note that we omit the dispatching step in which a ticket is first assigned to the initial group). The sequences A→B→C→D, G→E→C, and B→F→H are called ticket routing sequences.

It is realized that, in a large network of expert groups, being able to quickly route a new ticket to its resolver is essential to reduce labor cost and to improve customer satisfaction. Today, ticket routing decisions are often made manually and, thus, can be quite subjective and error-prone. Misinterpretation of the problem, inexperience of human individuals, and lack of communication between groups can lead to routing inefficiency. These difficulties call for computational models that can accurately represent the collaborative relationship between groups in solving different kinds of problems. Such models ought to provide fine-grain information not only to help experts reduce ticket routing errors, but also to help service enterprises better understand group interactions and identify potential performance bottlenecks.

In one existing approach, a Markov model-based approach is proposed to predict the resolver of a ticket, based on the expert groups that processed the ticket previously. In essence, the existing approach is a rule-based method, i.e., if group A processed a ticket and did not have a solution, it calculates the likelihood that group B can resolve it. A drawback of the existing Markov model-based approach is that it is locally optimized and, thus, might not be able to find the best ticket routing sequences. Moreover, it does not consider the contents of the tickets. That is, it uses a "blackbox" approach that can neither explain, nor fully leverage, the information related to why group A transfers a ticket to group B, when it cannot solve the problem itself.

In accordance with illustrative principles of the invention, these and other drawbacks are addressed by deriving a comprehensive model that incorporates ticket content. Rather than simply calculating the transfer probability, i.e., P (B|A), between two groups A and B, illustrative principles of the invention provide for building a generative model that captures why tickets are transferred between two groups, i.e., P(w|A→B), where w is a word in the ticket. In addition, a model is built that captures why a certain ticket can be resolved by a group B, i.e., P (w|B). Furthermore, illustrative principles of the invention provide for combining the local generative models into a global model, an Optimized Network Model (ONM), which represents the entire ticket resolution process in a network of expert groups.

The Optimized Network Model according to one embodiment of the invention has many applications. First, it can be trained using historical ticket data and then used as a recommendation engine to guide the routing of new tickets. Second, it can provide a mechanism to analyze the role of expert groups, to assess their expertise level, and to study the expertise awareness among them. Third, it can be used to simulate the ticket routing process, and help analyze the performance of an expert network under various ticket workloads.

Returning to FIG. 1, note that ticket resolution system 100 further includes a ticket routing engine 116 operatively coupled to the expert network 110. It is this ticket routing engine 116 that generates the above-mentioned models, and there from, recommends ticket routing sequences that improve the efficiency of the ticket resolution system 100. The ticket routing engine 116 is operatively coupled to an Optimized Network Model (ONM) store 118 where the ONM, as well as other models and information, may be stored.

Accordingly, illustrative principles of the invention provide many advantageous features.

For example, a unified framework is proposed in the form of the Optimized Network Model (ONM), which models ticket transfer and resolution in an expert network. Illustrative solutions are provided to estimate the parameters of the ONM, using maximum likelihood estimation. A gradient descent method is used in one illustrative embodiment to speed up the parameter learning process.

Further, a ticket routing algorithm is provided that analyzes all possible routes in the network, and determines the optimal route for a ticket to its resolver. It has been realized through experiments that this inventive ticket routing algorithm significantly outperforms existing classification-based algorithms.

Still further, it is shown that, unlike the sequence-only model of the above-mentioned Markov-model based approach, the ONM of the invention can explain why tickets are transferred between groups and how intermediate transfer steps can be used in finding the resolver. Hence, it can be used to evaluate the roles and performance of expert groups in a collaborative network. It is to be understood that a "collaborative network" is another name for an expert network, as described above, since the ticket routing process is considered a collaboration among the experts in an attempt to find the resolver for a ticket.

In the illustrative descriptions that are to follow, the following notation is used: $\mathcal{G} = \{g_1, g_2, \ldots, g_L\}$ is a set of expert groups in a collaborative network; $\mathcal{T} = \{t_1, t_2, \ldots, t_m\}$ is a set of tickets; and $\mathcal{W} = \{w_1, w_2, \ldots, w_n\}$ is a set of words that describe the problems in the tickets. A ticket includes three components: (1) a problem category to which the ticket belongs, e.g., a WINDOWS problem or a DB2 problem, which is identified when the ticket is generated; (2) the ticket content, i.e., a textual description of the problem symptoms; and (3) a routing sequence from the initial group to the final resolver group of the ticket. Although some complex tickets can be associated with multiple problem categories or can involve multiple resolvers, most tickets are associated with one problem category and can be resolved by one expert group. In this illustrative description, the model focuses on ticket routing in these common cases; although, the principles of the invention can be extended in a straightforward manner to other cases.

In this illustrative embodiment, it is assumed that the ticket routing engine 116 in FIG. 1 performs or otherwise controls theses steps. In the first step of routing, each ticket t is assigned to an initial expert group $g_{init}(t)$. If the initial group can not solve the problem, the engine 116 transfers the ticket to another group that it considers the appropriate candidate to solve the problem. After one or more transfer steps, the ticket eventually reaches the resolver group $g_{res}(t)$. The route that the ticket takes in the expert network is denoted R(t). Table 300 in FIG. 3 shows a ticket example, which is first assigned to group HDBTOIGA, and is finally resolved by group NUS_N_DSCTS.

Figure 4:
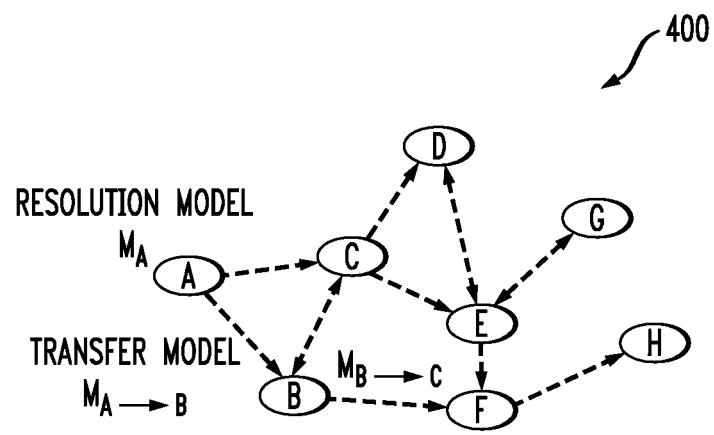
FIG. 4 illustrates a unified network model, according to an embodiment of the invention.

To model the interactions between groups in an expert network, it is realized that there is a need to understand how and why the tickets are transferred and resolved. Specifically, illustrative principles of the invention provide a modeling framework that include: (1) a Resolution Model $M_g(t)$ that captures the probability that group g resolves ticket t, and (2) a Transfer Model $M_{g_i \to g_j}(t)$ that captures the probability that group $g_i$ transfers ticket t to group $g_j$, if $g_i$ cannot resolve t. These two models are then combined into a unified network model, i.e., ONM, which represents the ticket lifecycle in the expert network. FIG. 4 illustrates the unified model concept with a combined model 400 including a Resolution Model and a Transfer Model.

Illustrative principles of the invention realize that the ticket contents and routing sequences of the historical tickets provide clues as to how tickets are routed by expert groups. In an illustrative expert network, it is assumed that each group has its own special expertise. Thus, if an expert group is capable of resolving one ticket, chances are it can also resolve other tickets with similar problem descriptions. Likewise, similar tickets typically have similar routing paths through the network. Accordingly, these properties may advantageously be characterized using generative models such as a Resolution Model (RM), a Transfer Model (TM), and an Optimized Network Model (ONM), where the ONM is a global model that combines the local models of the RM and TM.

We now describe a Resolution Model (RM). First, in accordance with illustrative principles of the invention, a generative model is built for each expert group using the textual descriptions of the problems the group has solved previously. Given a set $T_i$ of tickets resolved by group $g_i$ and W the set of words in the tickets in $T_i$ we build a resolver profile $P_{g_i}$ defined as the following column vector:

$$P_{g_i} = [P(w_1|g_i), P(w_2|g_i), \ldots, P(w_n|g_i)]^T \quad (1)$$

Equation (1) represents the word distribution among the tickets resolved by $g_i$. Here, $P(w_k|g_i)$ is the probability of choosing $w_k$ if we randomly draw a word from the descriptions of all tickets resolved by $g_i$. Thus, $$\sum_{k=1}^{n} P(w_k|g_i) = 1.$$

Assuming that different words appear independently in the ticket content, the probability that $g_i$ can resolve a ticket $t \in \mathcal{T}_i$ can be calculated from the resolver profile vector P as follows:

$$P(t|g_i) \propto \prod_{w_k \in t} P(w_k|g_i)^{f(w_k, t)} \quad (2)$$

where $w_k$ is a word contained in the content of ticket t and $f(w_k, t)$ is the frequency of $w_k$ in the content of t.

To find a set of most probable parameters $P(w_k|g_i)$, we use the maximum likelihood method. The likelihood that group $g_i$ resolves all of the tickets in $\mathcal{T}_i$ is:

$$\mathcal{L}(\mathcal{T}_i, g_i) = \prod_{t \in \mathcal{T}_i} P(t|g_i) \quad (3)$$

We maximize the log likelihood:

$$P_{g_i} = \arg\max_{P(\mathcal{W}|g_i)} (\log(\mathcal{L}(\mathcal{T}_i, g_i)))$$

$$= \arg\max_{P(\mathcal{W}|g_i)} \left( \sum_{w_k} n(w_k, \mathcal{T}_i) \log(P(w_k|g_i)) \right)$$

$$\text{s.t.} \sum_{w_k \in \mathcal{W}} P(w_k|g_i) = 1$$

where $n(w_k, \mathcal{T}_i) = \sum_{t \in \mathcal{T}_i} f(w_k, t)$ is the total frequency of the word $w_k$ in the ticket set $\mathcal{T}_i$. Hence, the maximum likelihood solution for the resolver profile vector $P_{g_i}$ is:

$$P(w_k|g_i) = \frac{n(w_k, \mathcal{T}_i)}{\sum_{w_j \in \mathcal{W}} n(w_j, \mathcal{T}_i)} \quad (4)$$

The Resolution Model is a multi-class text classifier, which considers only ticket content. Below, it will be seen that embedded in the ticket routing sequences are the transfer relations between groups, which can be used to improve the accuracy of our model.

We now describe a Transfer Model (TM). It has been realized that not only the resolver group, but also the intermediate groups in the ticket routing sequences, contribute to the resolution of a ticket. The reason is that, even if an expert group can not solve a problem directly, it might have knowledge of which other group is capable of solving it. To capture this effect, illustrative principles of the invention use both the ticket content and the routing sequence to model the transfer behavior between expert groups.

Considering an edge $e_{ij} = g_i \to g_j$ in the expert network, we let $\mathcal{T}_{ij}$ denote the set of tickets that are transferred along the edge $e_{ij}$ and let $\mathcal{W}$ denote the set of words in the tickets in $\mathcal{T}_{ij}$. Using the same technique as described above in the Resolution Model description, we build the transfer profile of an edge between two expert groups as the column vector:

$$P_{e_{ij}} = [P(w_1|e_{ij}), P(w_2|e_{ij}), \ldots, P(w_n|e_{ij})]^T \quad (5)$$

where $P_{e_{ij}}$ characterizes the word distribution among the tickets routed along edge $e_{ij}$ and $P(w_k|e_{ij})$ is the probability of choosing word $w_k$ if we randomly draw a word from the tickets transferred along edge $e_{ij}$. Similarly, we derive the maximum likelihood solution for the transfer profile of $e_{ij}$ as follows:

$$P(w_k|e_{ij}) = \frac{n(w_k, \mathcal{T}_{ij})}{\sum_{w_l \in \mathcal{W}} n(w_l, \mathcal{T}_{ij})} \quad (6)$$

The Transfer Model for the edges can be combined with the Resolution Model for the nodes to form the network model shown in FIG. 4. However, the parameters of these models are learned independently and, thus, might not achieve the best modeling accuracy. To address this problem, illustrative principles of the invention optimize the network model by learning these parameters globally.

We now describe an Optimized Network Model (ONM). It is to be understood that both the Resolution Model and the Transfer Model are local models. They are not optimized for end-to-end ticket routing in the expert network. Below, an optimized model is illustratively described that accounts for the profiles of the nodes and edges together in a global setting. Instead of considering only the tickets resolved by a certain expert group or transferred along a certain edge, this optimized model learns its parameters based on the entire set of tickets, using both their contents and their routing sequences. As we will see, this global model outperforms the local models.

We first describe routing likelihood with respect to the ONM. When a set $\mathcal{T}_i$ of tickets is routed to a group $g_i$, some of the tickets will be resolved if $g_i$ has the appropriate expertise, while the rest of the tickets will be transferred to other groups. If $g_i$ resolves a ticket, we assume that $g_i$ transfers the ticket to itself. We let $\mathcal{T}_{ij}$ be the set of tickets that are transferred from group $g_i$ to group $g_j$. Thus, $\mathcal{T}_i = \cup_{j=1}^L \mathcal{T}_{ij}$, where $\mathcal{T}_{ii}$ is the set of tickets resolved by group $g_i$ itself, and $L$ is the number of expert groups.

Given a ticket t and the expert group $g_i$ that currently holds the ticket t, the probability that t is transferred from group $g_i$ to group $g_j$ is:

$$P(g_j|t, g_i) = \frac{P(t|e_{ij})P(g_j|g_i)}{Z(t, g_i)} \quad (7)$$

$$= \frac{\left(\prod_{w_k \in t} P(w_k|e_{ij})^{f(w_k,t)}\right) P(g_j|g_i)}{Z(t, g_i)}$$

where $Z(t, g_i) = \sum_{g_j \in \mathcal{G}} P(t|e_{ij})P(g_j|g_i)$ and $P(g_j|g_i)$ is the prior probability that $g_i$ transfers a ticket to $g_j$. $P(g_j|g_i)$ can be estimated by $|\mathcal{T}_{ij}|/|\mathcal{T}_i|$. To simplify the notation, we let $P(g_i|t,g_i)$ represent the probability that group $g_i$ is able to resolve ticket t if t is routed to $g_i$. Hence, $P(w|e_{ii})$ is the resolution model of $g_i$. Because a ticket description is often succinct with few redundant words, we assume $f(w_k,t)=1$ if $w_k$ occurs in t and $f(w_k,t)=0$ otherwise. This assumption significantly simplifies the derivation of the model.

Each historical ticket t has a routing sequence R(t). For example, $R(t)=g_1 \to g_2 \to g_3$, with initial group $g_{init}(t)=g_1$ and resolver group $g_{res}(t)=g_3$. We assume that an initial group $g_i$ is given for each ticket t, i.e., $P(g_1|t)=1$ and that each expert group makes its transfer decisions independently. In this case, the probability that the routing sequence $g_1 \to g_2 \to g_3$ occurs is:

$$P(R(t)|t) = P(g_1|t)P(g_2|t, g_1)P(g_3|t, g_2)P(g_3|t, g_3)$$

$$= P(g_2|g_1)P(g_3|g_2)P(g_3|g_3) \times$$

$$\frac{P(t|e_{1,2})P(t|e_{2,3})P(t|e_{3,3})}{Z(t, g_1)Z(t, g_2)Z(t, g_3)}$$

We assume further that the tickets are independent of each other. Thus, the likelihood of observing the routing sequences in a ticket set $\mathcal{T}$ is:

$$\mathcal{L} = \prod_{t \in \mathcal{T}} P(R(t)|t) \quad (8)$$

We next describe parameter optimization with respect to ONM. To find a set of globally optimal parameters $P(w_k|e_{ij})$, we use maximum likelihood estimation to maximize the log likelihood:

$$\log \mathcal{L} = \sum_{t \in \mathcal{T}} \log P(R(t)|t) \quad (9)$$

$$= \sum_{t \in \mathcal{T}} \sum_{e_{ij} \in R(t)} \log \frac{P(t|e_{ij}) \times P(g_j|g_i)}{Z(t, g_i)}$$

$$= \sum_{e_{ij} \in \varepsilon} \sum_{t \in \mathcal{T}_{ij}} (\log(P(t|e_{ij})) + \log(P(g_j|g_i))) -$$

$$\sum_{g_i \in \mathcal{G}} \sum_{t' \in \mathcal{T}_i} \log(Z(t', g_i))$$

where $\varepsilon = \{e_{ij} | 1 \leq i,j \leq L\}$ and $P(t|e_{ij}) = \pi_{w_k \in t} P(w_k|e_{ij})$. The optimal transfer profile is given by the following constrained optimization problem:

$$P(\mathcal{W}/\varepsilon)^* = \arg\max_{P(\mathcal{W}|\varepsilon)} (\log \mathcal{L}) \quad (10)$$

$$s.t. \sum_{w_k \in \mathcal{W}} P(w_k|e_{ij}) = 1;$$

$$P(w_k|e_{ij}) \geq 0$$

where $\mathcal{W}$ is the set of words and $\varepsilon$ is the set of edges.

This optimization problem is not convex, and it involves many free dimensions (the degree of freedom is $(|\mathcal{W}|-1) \times |\mathcal{G}|^2$). It can not be solved efficiently with existing tools.

Thus, we seek solutions that are near-optimal but easier to calculate. One illustrative approach of the invention is to update the parameters $P(w_k|e_{ij})$ iteratively to improve the likelihood. Specifically, we use the steepest descent method to maximize the lower bound of the log likelihood. By Jensen's inequality, we have $$Z(t, g_i) \leq \prod_{w_k \in t} \sum_{g_l \in G} P(g_l|g_i) P(w_k|e_{il}) \quad (11)$$

Combining Equation (9) and Equation (11), we have:

$$\log \mathcal{L} \geq \lfloor \log \mathcal{L} \rfloor = \sum_{e_{ij}} \frac{\lambda}{n_{ij}} (\log(P(t \mid e_{ij})) + \log(P(g_j \mid g_i))) -$$

$$\sum_{n,a} \sum_{t' \in T_i} \sum_{w_k \in t'} \log(\sum_{n,a} (P(g_l \mid g_i) \times P(w_k \mid e_{il})))$$

The gradient is given by:

$$\nabla \lfloor \log(\mathcal{L}) \rfloor = \frac{\partial \lfloor \log \mathcal{L} \rfloor}{\partial P(w_k \mid e_{ij})}$$

$$= \frac{\sum_{t \in T_{ij}} n(w_k, t)}{P(w_k \mid e_{ij})} -$$

$$\frac{P(g_j \mid g_i) \times \sum_{t' \in T_i} n(w_k, t')}{\sum_{g_l \in G} P(g_l \mid g_i) \times P(w_k \mid e_{il})}$$

Using the values of $P(w_k \mid e_{ij})$ calculated in Equation (6) as the starting point, we iteratively improve the solution along the gradient. To satisfy the constraints, we calculate the projection of the gradient in the hyperplane defined by $\Sigma_{w_k \in W} P(w_k \mid e_{ij}) = 1$ to ensure that the solution stays in the feasible region. The profiles of the edges in the network are updated one at a time, until they converge. Although the gradient-based method might produce a local optimum solution, it estimates the model parameters all together from a global perspective and provides a better estimation than the TM locally-optimized solution.

We now describe illustrative ticket routing algorithms that utilize the generative models described above to determine an optimized ticket routing sequence for a problem ticket. Recall that the ticket routing engine 116 in FIG. 1 performs and otherwise controls such ticket routing algorithms.

Given a new ticket t and its initial group $g_{init}(t)$, a routing algorithm uses a model $\mathcal{M}$ to predict the resolver group $g_{res}(t)$. If the predicted group is not the appropriate resolver, the algorithm keeps on predicting, until the resolver group is found. The performance of a routing algorithm can be evaluated in terms of the number of expert groups it tried until reaching the resolver. Specifically, we let the predicted routing sequence for ticket $t_i$ be $R(t_i)$ and let $|R(t_i)|$ be the number of groups tried for ticket $t_i$. For a set of testing tickets $\mathcal{T} = \{t_1, t_2, \ldots, t_m\}$, we evaluate the performance of a routing algorithm using the Mean Number of Steps To Resolve (MSTR) given by:

$$S = \frac{\sum_{i=1}^{m} |R(t_i)|}{m} \quad (12)$$

The ticket routing problem is related to the multi-class classification problem in that we are seeking a resolver (class label) for each ticket. Different from a classification problem, a goal here is not to maximize the classification precision, but to minimize the expected number of steps before the algorithm reaches the appropriate resolver.

Nevertheless, in this illustrative embodiment, we can adapt a multi-class classifier to fit our problem. We assume that a classifier C predicts group g as the resolver of ticket t, with probability $P(g \mid t)$. A simple approach is to rank the potential resolver groups in descending order of $P(g \mid t)$ and then transfer the ticket t to them one by one, until the appropriate resolver is found. In this approach, the ranking of groups does not change, even if the current prediction is incorrect. We take the Resolution Model as an example, and as the baseline method, for building a classifier. Then, we develop two dynamic ranking methods, using the Transfer Model and the Optimized Network Model, to achieve better performance.

In one embodiment, principles of the invention provide a Ranked Resolver algorithm. The Ranked Resolver algorithm is designed exclusively for the Resolution Model (RM). Expert groups are ranked based on the probability that they can resolve the ticket according to the ticket content.

Given a new ticket t, the probability that expert group $g_i$ can resolve the ticket is:

$$P(g_i \mid t) = \frac{P(g_i) P(t \mid g_i)}{P(t)} \quad (13)$$

$$\propto P(g_i) \prod_{w_k \in t} P(w_k \mid g_i)^{f(w_k, t)}$$

Here, $P(g_i)$ is the prior probability of group $g_i$ being a resolver group, which is estimated by $|\mathcal{T}_i|/|\mathcal{T}|$, where $\mathcal{T}$ is the set of tickets resolved by $g_i$ and $\mathcal{T}$ is the ticket training set.

A routing algorithm for this model tries different candidate resolver groups in descending order of $P(g_i, t)$. The algorithm works sufficiently unless the new ticket t contains a word that has not appeared in the training ticket set $\mathcal{T}$. In that case, $P(g_i \mid t)$ is zero for all i. To avoid this problem, we introduce a smoothing factor $\lambda$ to calculate the probability, i.e., $$P(w \mid g_i)^* = \lambda \times P(w \mid g_i) + (1 - \lambda)/|\mathcal{W}| \quad (14)$$

Using the smoothed value $P(w \mid g_i)^*$ guarantees a positive value of $P(g_i \mid t)$ for all i.

In another embodiment, principles of the invention provide a Greedy Transfer algorithm. The Greedy Transfer algorithm makes one step transfer predictions and selects the most probable resolver as the next step.

When a new ticket t first enters the expert network, it is assigned to an initial group $g_{init}$. Instead of calculating which group is likely to solve the problem, we determine the group to which the ticket should be transferred, because tickets should be transferred to the group that can solve the problem or the group that knows which group can solve the problem. The probability that a ticket t is routed through the edge $e_{init,j} = g_{init} \rightarrow g_j$, where $g_j \in \mathcal{G} \setminus \{g_{init}\}$, is:

$$P(g_j \mid t, g_{init}) = \frac{P(g_j \mid g_{init}) P(t \mid e_{init,j})}{\sum_{g_l \in G} P(g_l \mid g_{init}) P(t \mid e_{init,l})} \quad (15)$$

$$= \frac{P(g_j \mid g_{init}) \prod_{w_k \in t} P(w_k \mid e_{init,j})^{f(w_k, t)}}{\sum_{g_l \in G} P(g_l \mid g_{init}) \prod_{w_k \in t} P(w_k \mid e_{init,l})^{f(w_k, t)}}$$

Note that smoothing is applied as described in Equation (14).

The expert group $g^* = \arg\max_{g_j \in \mathcal{G}} P(g_j \mid t, g_{init})$ is selected to be the next expert group to handle ticket t. If $g^*$ is the resolver, the algorithm terminates. If not, the algorithm gathers the information of all previously visited expert groups to make the next step routing decision. If a ticket t has gone through the expert groups in R(t) and has not yet been solved, the rank of the remaining expert groups in $\mathcal{G} \setminus R(t)$ is:

$$\text{Rank}(g_j) \propto \max_{g_i \in R(t)} P(g_j | t, g_i) \quad (16)$$

and the ticket is routed to the group with the highest rank. The rank of $g_j$ is determined by the maximum probability of $P(g_j|t, g_i)$ for all the groups $g_i$ that have been tried in the route. The ranked order of the candidate resolvers might change during routing.

In yet another embodiment, principles of the invention provide a Holistic Routing algorithm. The Holistic Routing algorithm recognizes the most probable resolver that can be reached within K transfer steps, and selects the next group from a global perspective. In the experiments, we set K equal to 3. Instead of predicting only one step as do the Ranked Resolver and Greedy Transfer algorithms, the Holistic Routing algorithm calculates the probability that a candidate group can be reached and can solve the ticket in multiple steps.

For a new ticket t, the one step transition probability $P(g_j|t, g_i)$ between two expert groups $g_i$ and $g_j$ is calculated using Equation (15). Thus, we perform a breadth-first search to calculate the probability that a ticket t is transferred by $g_i$ to $g_j$ in exactly K steps. This probability can be estimated iteratively, using the following equations:

$$P(g_j, 1|t, g_i) = \begin{cases} P(g_j|t, g_i) & \text{if } i \neq j \\ 0 & \text{otherwise} \end{cases}$$

$$P(g_j, 1|t, g_i) = \sum_{g_k \in G; k \neq j} P(g_k, K-1/t, g_i) P(g_j|t, g_k) \text{ if } K > 1.$$

If $g_i = g_{init}$ the initial group for ticket t, the above equation can be written as:

$$P(g_j, K|t, g_I) = vM^K \quad (17)$$

where v is the unit vector whose lth component is 1 and other components are 0. The one step transfer probability matrix M is a $|\mathcal{G}| \times |\mathcal{G}|$ matrix, where an entry of M is the one step transition probability between the expert groups $g_i$ and $g_j$ given by:

$$\text{Rank}(g_j | g_{init}) \equiv \sum_{k=1}^{K} P(g_j, k | t, g_{init}) \times P(g_j | t, g_j) \quad (18)$$

The probability that $g_j$ can resolve the ticket t in K or fewer steps starting from the initial group $g_{init}$ (which is used to rank the candidate resolver groups) is:

$$M(i, j) = \begin{cases} P(g_j|t, g_i) & \text{if } i \neq j \\ 0 & \text{otherwise} \end{cases}$$

where $P(g_j|t,g_j)$ is the probability that $g_j$ resolves t if t reaches $g_j$ (see Equation (7)). Starting with $g_{init}$, we route t to the group $g^* = \arg\max_{g_j \in \mathcal{G}; j \neq init} \text{Rank}(g_j | g_{init})$.

Theoretically, we can derive the rank in closed form for an infinite number of transfer steps. In practice, $M^K$ decays quickly as K increases, due to the probability of solving the ticket at each step. A relatively small value of K suffices to rank the expert groups. By way of example only, K could be about 10 or 20; however, other values are contemplated as being within the scope of the invention.

Given the predicted expert group $g_k$, if ticket t remains unresolved and needs to be transferred, the posterior probability of $g_k$ being the resolver for t is zero and the one step transfer matrix M needs to be updated accordingly. Thus, if $g_k$ is not the resolver, the elements in the k th row of M are updated by:

$$M(k, j) = \frac{P(g_j | t, g_k)}{\sum_{i, i \neq k} P(g_i | t, g_k)} \text{ for } j \neq k$$

Once M is updated, the algorithm re-ranks the groups according to Equation (18) for each visited group in R(t). That is, $\text{Rank}(g_j) \propto \max_{g_i \in R(t)} \text{Rank}(g_j|g_i)$. The group with the highest rank is selected as the next possible resolver.

For a given new ticket, the Holistic Routing algorithm is equivalent to enumerating all of the possible routes from the initial group to any candidate group. For each route $r = \{g_1, g_2, \ldots, g_m\}$ for a ticket t, we calculate the probability of the route as:

$$P(r|t) = P(g_m|t, g_m) \prod_{1 \leq j \leq m-1} P(g_{j+1}|t, g_j)$$

The probability that group $g_j$ resolves ticket t is:

$$\text{Rank}(g_j) \equiv \sum_r P(r|t) \text{ for all } r \text{ ending at } g_j$$

Figure 5:
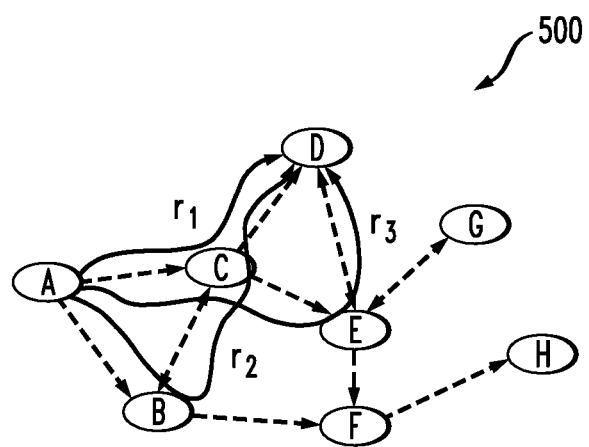
FIG. 5 illustrates a ticket routing algorithm, according to an embodiment of the invention.

FIG. 5 shows an example 500 where a ticket t enters the expert network at group A. The algorithm enumerates all of the routes that start at A and end at D to calculate how likely D resolves the ticket. Note that loops in the routes are allowed in the calculation in Equation (17). It is also possible to calculate the resolution probability without loops. However, because the intermediate groups for each route must be remembered, the calculation might take a long time.

As mentioned above, while illustrative embodiments of the invention focuses on using the inventive model to make effective ticket routing decisions, the model has other significant applications. By way of example only, expertise assessment in an expert network and ticket routing simulation for performance analysis and workforce/resource optimization.

In essence, the inventive model (ONM) represents the interactions between experts in an enterprise collaborative network. By analyzing ticket transfer activities at the edges of the network, we can identify different roles of individual expert groups, i.e., whether a group is more effective as a ticket resolver or a ticket transferrer. We can also analyze the expertise awareness between groups.

Figure 6:
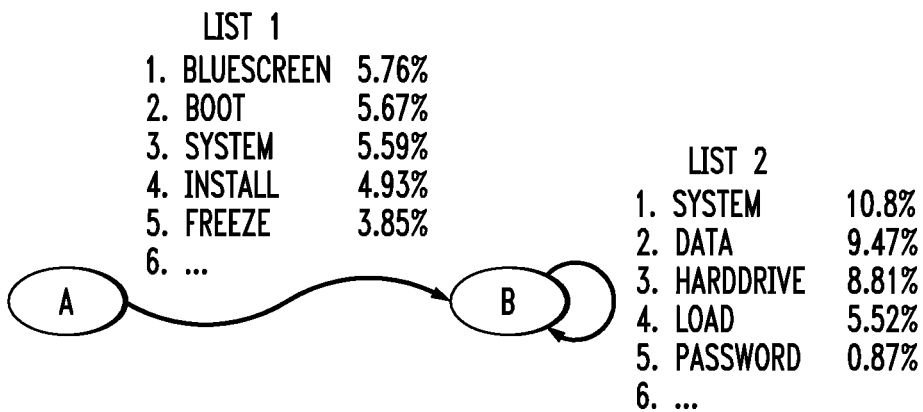
FIG. 6 illustrates an expert assessment example, according to an embodiment of the invention.

For instance, FIG. 6 shows the most prominent words derived from ONM in the context of tickets transferred from group A to group B (List 1), as well as those resolved by group B itself (List 2). List 1 is related to system boot failures (bluescreen, freeze), while List 2 is related to data loading issues in hard drives. The mismatch between the two lists indicates that either A is not well aware of B's expertise, or A thinks that B can better identify the resolvers for tickets described by words in List 1. Further analysis is needed to understand these interactions and implications. The inventive model can facilitate such analysis.

The inventive model can also be used to simulate the routing of a given set of tickets. The simulation can help an enterprise analyze its existing ticket routing process to identify performance bottlenecks and optimize workforce/resources. Moreover, the simulation can be used to assess the "criticality" of expert groups, e.g., whether the routing performance is improved or degraded, if a group is removed from the network. Such a knockout experiment is infeasible in practice, but can be conducted by simulation.

Figure 7:
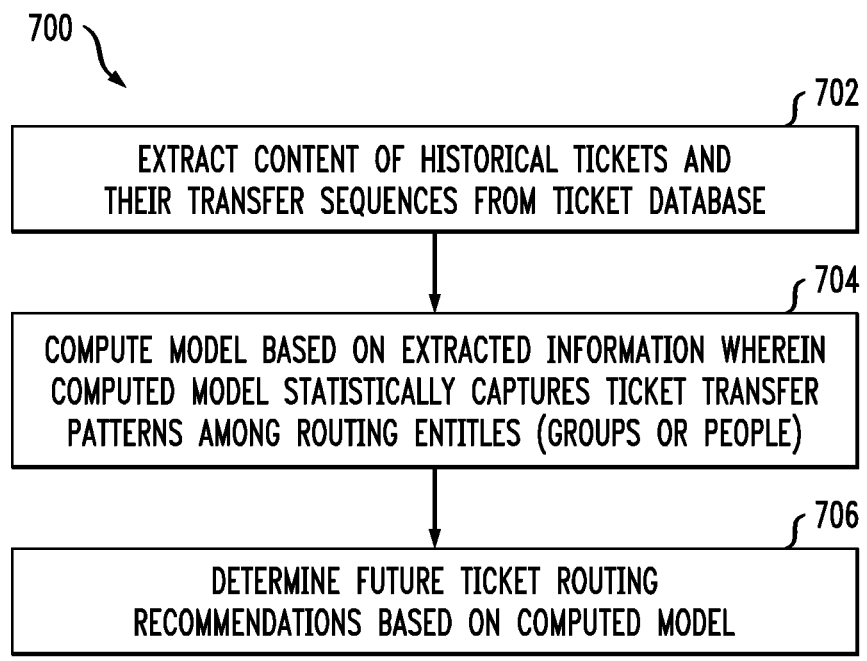
FIG. 7 illustrates a ticket resolution methodology, according to an embodiment of the invention.

Referring now to FIG. 7, a ticket resolution methodology is illustrated. Ticket resolution methodology 700 may be performed by the ticket routing engine 116 in FIG. 1.

As shown, in step 702, content of historical tickets and their transfer sequences are extracted from a ticket database. The database may be part of the ticket processing engine 106 in FIG. 1, or it could be maintained as part of store 118 in FIG. 1.

In step 704, a mathematical model (in one embodiment, the ONM model described above) is built (computed) upon the data extracted in step 702. As explained in detail above, the computed model statistically captures the ticket transfer patterns among routing entities (groups or people). It is to be understood that a computed model may take the form of a data structure having associated parameters and features as described above in detail.

Accordingly, in step 706, future ticket routing recommendations are made based on the model derived (computed) in step 704.

For a new open ticket, the ticket routing entity (the group or person who currently holds the ticket) can either fully or partially rely on the recommendations made by the ticket routing engine 116. Furthermore, for a single ticket, various ticket routing entities may continue to obtain routing recommendations from the engine 116 while the ticket is being transferred among them, until the ticket is resolved.

Thus, it is to be understood that the ticket routing engine can operate as a fully-automated recommendation engine, which will make an optimal routing prediction at the very beginning of the ticket routing process which will then be automatically implemented, or the engine can also be used as a semi-automated recommendation engine where experts decide whether or not to implement the recommendation at the start and/or at intermediate points through the resolution process.

Accordingly, as explained in detail herein, illustrative principles of the invention provide generative models that characterize ticket routing in a network of expert groups, using both ticket content and routing sequences. These models capture the capability of expert groups either in resolving the tickets or in transferring the tickets along a path to a resolver. The Resolution Model considers only ticket resolvers and builds a resolution profile for each expert group. The Transfer Model considers ticket routing sequences and establishes a locally optimized profile for each edge that represents possible ticket transfers between two groups. The Optimized Network Model (ONM) considers the end-to-end ticket routing sequence and provides a globally optimized solution in the collaborative network. For ONM, a numerical method is provided to approximate the optimal solution which, in general, is difficult to compute.

The generative models can be used to make routing predictions for a new ticket and minimize the number of transfer steps before it reaches a resolver. For the generative models, three illustrative routing algorithms are provided to predict the next expert group to which to route a ticket, given its content and routing history. Experimental results show that the inventive algorithms can achieve better performance than existing ticket resolution methods.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-7, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-7, can also include, as described herein, providing a system, wherein the system includes distinct modules (e.g., modules comprising software, hardware or software and hardware). By way of example only, the modules may include, but are not limited to, a customer module, a ticket processing engine module, one or more expert modules (e.g., each workstation that a human expert utilizes to address the ticket or each automated/computer-based expert), a ticket routing engine module, a model storage module, and a historical ticket database module. These and other modules may be configured, for example, to perform the steps described and illustrated in the context of FIGS. 1-7.

Figure 8:
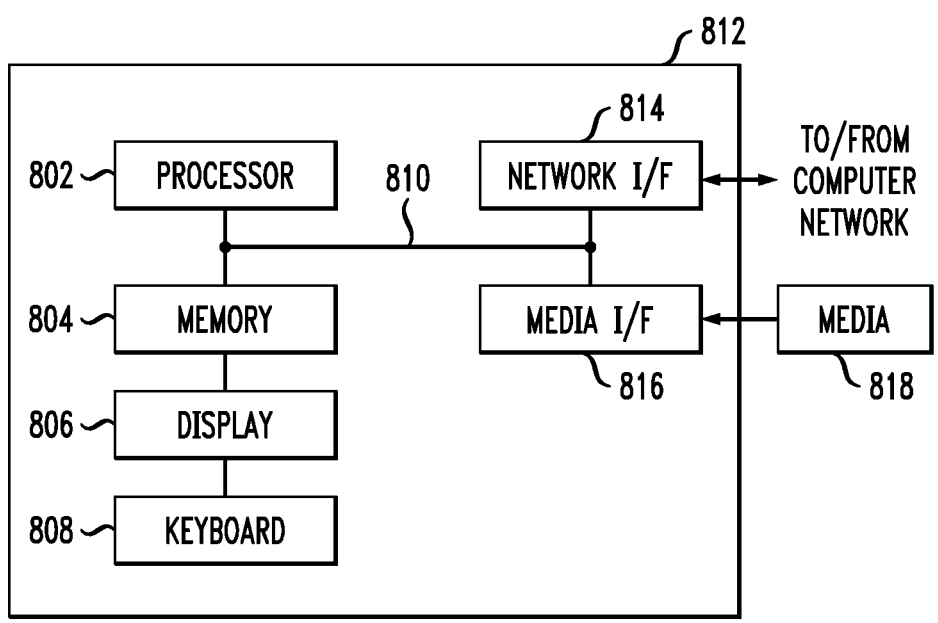
FIG. 8 is a block diagram of a computer system for implementing one or more steps and/or components in accordance with one or more embodiments of the invention.

One or more embodiments can make use of software running on a general purpose computer or workstation. With reference to FIG. 8, such an implementation 800 employs, for example, a processor 802, a memory 804, and an input/output interface formed, for example, by a display 806 and a keyboard 808. The term "processor" as used herein is intended to include any processing device, such as, for example, one that includes a CPU (central processing unit) and/or other foams of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 802, memory 804, and input/output interface such as display 806 and keyboard 808 can be interconnected, for example, via bus 810 as part of a data processing unit 812. Suitable interconnections, for example, via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808, display 806, pointing device, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 812 as shown in FIG. 8) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:

extracting information comprising: content of one or more historical records associated with resolutions of one or more previous issues; and transfer routing sequences indicating routes through routing entities in an expert network that the one or more previous issues passed in order to be respectively resolved;

computing a model based on at least a portion of the extracted information, wherein the computed model statistically captures one or more ticket transfer patterns among routing entities in the expert network; and determining one or more future issue resolution routing recommendations based on at least one of the one or more ticket transfer patterns captured by the computed model;

wherein the extraction, computation and determination steps are performed by a computer system comprising a memory and at least one processor coupled to the memory.

2. The method of claim 1, wherein the one or more records comprise one or more problem tickets.

3. The method of claim 1, further comprising obtaining a new issue request.

4. The method of claim 3, further comprising utilizing at least one of the one or more future issue resolution routing recommendations to resolve the new issue.

5. The method of claim 3, further comprising utilizing at least one of the one or more future issue resolution routing recommendations to determine a next routing entity in the expert network to which to route the new issue request.

6. The method of claim 1, wherein routing entities in the expert network comprise experts, and a group of one or more experts comprises an expert group.

7. The method of claim 6, wherein the model computing step further comprises computing a resolution-based model for a given expert group in the expert network.

8. The method of claim 7, wherein the resolution-based model for a given expert group is computed based on one or more textual descriptions of the one or more previous issues the given expert group has previously resolved.

9. The method of claim 8, wherein the resolution-based model comprises a resolution profile vector for the given expert group, the vector being defined by a probabilistic distribution of words in the textual descriptions.

10. The method of claim 9, wherein a probability that the given expert group can resolve a new issue request is computable from the resolution profile vector.

11. The method of claim 10, wherein the probability is computable based on a maximum likelihood method.

12. The method of claim 6, wherein the model computing step further comprises computing a transfer-based model for a given transfer behavior for a given set of expert groups in the expert network.

13. The method of claim 12, wherein the transfer-based model comprises a transfer profile vector for the given set of expert groups, the vector being defined by a probabilistic distribution of words in textual descriptions of issue records transferred between at least two of the expert groups in the given set of expert groups.

14. The method of claim 13, wherein a probability that one of the expert groups in the given set of expert groups can resolve a new issue request is computable from the transfer profile vector.

15. The method of claim 14, wherein the probability is computable based on a maximum likelihood method.

16. The method of claim 6, wherein the model computing step further comprises computing an optimized network-based model for a given set of issues across the expert groups of the expert network.

17. The method of claim 16, wherein the optimized network-based model comprises a routing likelihood probability that, given an issue record and a first expert group that currently holds the issue record, the issue record is transferred from the first expert group to the second expert group.

18. The method of claim 17, wherein, given an issue record t and an expert group $g_i$ that currently holds the issue record t, the routing likelihood probability that the issue record t is transferred from the expert group $g_i$ to an expert group $g_j$ over network edge $e_{ij}$ is represented as:

$$P(g_j \mid t, g_i) = \frac{P(t \mid e_{ij})P(g_j \mid g_i)}{Z(t, g_i)}$$

$$= \frac{\left(\prod_{w_k \in t} P(w_k \mid e_{ij})^{f(w_k, t)}\right) P(g_j \mid g_i)}{Z(t, g_i)}$$

where $Z(t,g_i) = \Sigma_{g_j \in g} P(t|e_{ij})P(g_j|g_i)$ and $P(g_j|g_i)$ is the prior probability that the expert group $g_i$ transfers an issue record with word $w_k$ to the expert group $g_j$.

19. The method of claim 18, wherein a set of globally optimal parameters for at least a portion of the model is determined based on a maximum likelihood estimation method.

20. The method of claim 19, wherein the set of globally optimal parameters are updated using a gradient descent method.

21. The method of claim 1, wherein the computed model globally represents both issue record transfer and resolution in the expert network.

22. The method of claim 1, further comprising utilizing the computed model to interpret expertise of one or more experts in an unknown expert network.

23. The method of claim 1, further comprising dynamically adapting the computed model based on one or more subsequent issue records and issue resolutions.

24. The method of claim 1, wherein one or more of the future issue resolution routing recommendations are implementable automatically.

25. The method of claim 1, wherein one or more of the future issue resolution routing recommendations are implementable semi-automatically.

26. An apparatus, comprising:

a memory; and at least one processor operatively coupled to the memory and configured to:

extract information comprising: content of one or more historical records associated with resolutions of one or more previous issues; and transfer routing sequences indicating routes through routing entities in an expert network that the one or more previous issues passed in order to be respectively resolved;

compute a model based on at least a portion of the extracted information, wherein the computed model statistically captures one or more ticket transfer patterns among routing entities in the expert network; and determine one or more future issue resolution routing recommendations based on at least one of the one or more ticket transfer patterns captured by the computed model.

27. An article of manufacture comprising a non-transitory computer readable storage medium having tangibly embodied thereon computer readable program code which, when executed, causes a computer to:
- extract information comprising:
  - content of one or more historical records associated with resolutions of one or more previous issues; and
  - transfer routing sequences indicating routes through routing entities in an expert network that the one or more previous issues passed in order to be respectively resolved;
- compute a model based on at least a portion of the extracted information, wherein the computed model statistically captures one or more ticket transfer patterns among routing entities in the expert network; and
- determine one or more future issue resolution routing recommendations based on at least one of the one or more ticket transfer patterns captured by the computed model.

28. A system, comprising:
- an information extraction module for extracting information comprising: content of one or more historical records associated with resolutions of one or more previous issues; and transfer routing sequences indicating routes through routing entities in an expert network that the one or more previous issues passed in order to be respectively resolved;
- a model computation module for computing a model based on at least a portion of the extracted information, wherein the computed model statistically captures one or more ticket transfer patterns among routing entities in the expert network; and
- a routing recommendation module for determining one or more future issue resolution routing recommendations based on at least one of the one or more ticket transfer patterns captured by the computed model;
- wherein the information extraction module, the model computation module, and the routing recommendation module are implemented on a computer system comprising a memory and at least one processor coupled to the memory.

* * * * *